US012783665B2

(12) United States Patent
Dasgupta et al.

(10) Patent No.: US 12,783,665 B2
(45) Date of Patent: Nov. 3, 2026

(54) AI-POWERED ADVANCED MALWARE DETECTION SYSTEM

(71) Applicants: Dipankar Dasgupta, Germantown, TN (US); Subash Poudyal, Memphis, TN (US)

(72) Inventors: Dipankar Dasgupta, Germantown, TN (US); Subash Poudyal, Memphis, TN (US)

( * ) Notice: Subject to any disclaimer, the term of this patent is extended or adjusted under 35 U.S.C. 154(b) by 289 days.

(21) Appl. No.: 17/732,563

(22) Filed: Apr. 29, 2022

(65) Prior Publication Data

US 2022/0366048 A1 Nov. 17, 2022

Related U.S. Application Data

(60) Provisional application No. 63/334,276, filed on Apr. 25, 2022, provisional application No. 63/181,307, filed on Apr. 29, 2021.

(51) Int. Cl.
*G06F 21/56* (2013.01)

(52) U.S. Cl.
CPC .......... *G06F 21/566* (2013.01); *G06F 21/563* (2013.01)

(58) Field of Classification Search
CPC ............................ G06F 21/566; G06F 21/563
See application file for complete search history.

(56) References Cited

U.S. PATENT DOCUMENTS 9,171,160 B2 10/2015 Mncent et al.
10,204,224 B2 * 2/2019 Lu ........................ G06F 21/564
10,762,206 B2 9/2020 Titonis et al.
10,848,519 B2 11/2020 Howard et al.
11,232,199 B2 * 1/2022 Schmugar ............ H04L 9/0643
2013/0291108 A1 * 10/2013 Yu ....................... H04L 63/1458 726/23
2016/0012227 A1 1/2016 Tuvell et al.
(Continued)

FOREIGN PATENT DOCUMENTS

CN 106503552 A * 3/2017 .......... G06F 21/562
CN 110856178 A * 2/2020 ....... G06F 18/23213
(Continued)

OTHER PUBLICATIONS

Fernando, Damien Warren, et al., “A Study on the Evolution of Ransomware Detection Using Machine Learning and Deep Learning Techniques,” IoT 2020, Dec. 15, 2020, pp. 551-604, MDPI (Basel, Switzerland).
(Continued)

*Primary Examiner* — Darshan I Dhruv
(74) *Attorney, Agent, or Firm* — Wayne Edward Ramage; Baker Donelson

(57) ABSTRACT

An artificial intelligence (AI) based advanced malware detection tool (AIMaD), which uses a combination of both static and dynamic malware analysis in a machine learning (ML) framework. It uses reverse engineering and feature extraction technique at DLL, function call, and assembly levels; these multi-level features are then processed with N-gram (i.e., Natural Language Processing, NLP), association rule mining to feed in different machine learning classifiers. The AIMaD is able to detect malware/ransomware with high accuracy and low false-positive rate.

14 Claims, 7 Drawing Sheets

(56) References Cited

U.S. PATENT DOCUMENTS

| | | | | |
|---|---|---|---|---|
| 2018/0025157 | A1* | 1/2018 | Titonis | H04W 12/128<br>726/22 |
| 2018/0181752 | A1* | 6/2018 | Guri | G06F 21/554 |
| 2018/0324195 | A1* | 11/2018 | Gupta | G06F 21/566 |
| 2020/0026851 | A1 | 1/2020 | Dhankha et al. | |
| 2020/0201998 | A1* | 6/2020 | Jung | G06F 11/3037 |
| 2020/0311268 | A1* | 10/2020 | Kostyushko | G06F 21/561 |
| 2020/0311766 | A1* | 10/2020 | Shiravi Khozani | G06F 21/53 |
| 2021/0006650 | A1* | 1/2021 | Yankov | H04W 4/029 |

FOREIGN PATENT DOCUMENTS

| | | | | | |
|---|---|---|---|---|---|
| CN | 112257062 | A | * | 1/2021 | G06F 21/53 |
| KR | 1020170163681 | B1 | | 6/2019 | |
| KR | 1020190029104 | B1 | | 9/2020 | |

OTHER PUBLICATIONS

Gilbert, Daniel, et al., “The rise of machine learning for detection and classification of malware: Research developments, trends and challenges,” Journal of Network and Computer Applications 153 (2020) 102526, Jan. 2, 2020, pp. 1-22, Elsevier.

* cited by examiner

510

```
Algorithm 1 HMLP behavioral chaining
procedure HMLP_BEHAVIORAL_CHAINING(PE binaries)
    Step 1: Manual_chaining_crypto_ransomware
    for one sample from each ransomware families in [Locky, TeslaCrypt, GandCrab, CryptoWall, Cerber, Petya] do
        Hybrid RE of binaries
        Extract features at multi-level
        Inspect/analyze run time execution trace
        Identify and define major functionality chains
        Add multi-level ingredients to major chains
        Identify and define minor functionality chains for each major chains
        Add multi-level ingredients to each minor sub chains
        For all remaining chains keep as arbitrary chains
    end for
    Step 2: Automatic_chaining_all_samples
    for each sample in dataset do
        Hybrid RE of binaries
        Extract features at multi-level
        FP-growth rule mining at multi-level
        For each chain/rule with confidence 0.8 and score 1
        Check if a rule matches with defined functionality chain from Step 1
        Add chain as a distinct chain to feature dataset if matched
        Add chain as an arbitrary chain to feature dataset if not matched
    end for
    return behavioral chains
end procedure
```

FIG. 5

610

| | |
|---|---|
| CHAIN A | System services with initial setup |
| CHAIN B | Module enumeration |
| CHAIN C | Anti-analysis |
| CHAIN D | Access elevation |
| CHAIN E | Snapshot |
| CHAIN F | Parameter setup |
| CHAIN G | System profiling |
| CHAIN H | Encryption setup |
| CHAIN I | File encryption |
| CHAIN J | Ransom note |
| CHAIN K | Network enumeration |
| CHAIN L | Deletion |
| CHAIN M | Error handling |
| CHAIN N | CC communication |

FIG. 6

AI-POWERED ADVANCED MALWARE DETECTION SYSTEM

This application claims benefit of and priority to U.S. Provisional Application No. 63/181,307, filed Apr. 29, 2021, and U.S. Provisional Application No. 63/334,276, filed Apr. 25, 2022. The complete disclosures, specifications, drawings and appendices of U.S. Provisional Applications Nos. 63/181,307 and 63/334,276 are incorporated herein by specific reference for all purposes.

FIELD OF INVENTION

This invention relates to a system and related methods to prevent and protect against attacks by advanced malware, including, but not limited to, ransomware.

BACKGROUND OF INVENTION

Advanced malware attacks, such as ransomware attacks, are taking advantage of the ongoing pandemic situations, and compromising vulnerable systems in business, health, education, insurance, bank, and governmental sectors. Security companies and researchers continuously examine and investigate emerging malware, but increasing variations in malware design and attacks continue to emerge, and thus continue to present a significant threat to vulnerable systems and services. For example, during the last two years approximately 200,000 malware incidents occurred in different sectors (e.g., business, government, and individuals) with estimated annual losses of more than $8 billion. Some of the latest malware/ransomware programs include WannaCryptor, Cerber, Crysis, Sodinokibi, and Stop, which make use of variations in encryptions, social engineering attack tricks, and C&C communications. There are commercial tools available in the market for malware/ransomware analysis and detection, but their effectiveness is limited and, ultimately, not satisfactory. In particular, the dynamic nature of advanced malware/ransomware often bypasses security checkpoints and make detection difficult.

SUMMARY OF INVENTION

The present invention comprises an artificial intelligence (AI) based advanced malware detection tool (AIMaD), which uses a combination of both static and dynamic malware analysis in a machine learning (ML) framework. It uses reverse engineering and feature extraction technique at DLL, function call, and assembly levels; these multi-level features are then processed with N-gram (i.e., Natural Language Processing, NLP), association rule mining to feed in different machine learning classifiers. The AIMaD is able to detect malware/ransomware with high accuracy and low false-positive rate.

BRIEF DESCRIPTION OF THE DRAWINGS

FIG. 5 shows a diagram of an algorithm for Hybrid Multi-layer Profiling (HMLP) of behavioral chains.

FIG. 6 shows a diagram of malware and ransomware behavior chains.

DETAILED DESCRIPTION OF EXEMPLARY EMBODIMENTS

In various exemplary embodiments, the present invention uses reverse engineering, dynamic binary analysis, and function call tracing, leveraging Cuckoo sandbox and Ghidra (used for disassembly and function call tracing) in an "intelligent" way. In particular, features are extracted at DLL, function call and assembly level, and processed with NLP, association rule mining techniques, and ML classifiers for malware detection and classification.

The software tool (AIMaD) provides a user-interpretable summary report of the malware analysis which is very useful for mitigation. Static analysis is used to capture the structural properties of the binary (executable). This is done using Object dump (a Linux based tool) and PE parser, an open-source tool which helps to reveal properties such as import and export of functions in the binaries in order to achieve high code coverage. Other PE parsers may be used.

Dynamic analysis is done using a virtualized environment such as, but not limited to, a Cuckoo sandbox, and a dynamic binary instrumentation (DBI) tool, such as, but not limited to, PIN. Cuckoo sandbox has a modular design supporting multiple environments and provides flexibility in result analysis. Other forms of virtualized environment may be used.

If highly sophisticated malware does not run in a virtualized environment, then its function call trace is studied via reverse engineering using the NSA's Ghidra tool. Dynamic analysis of program traces is performed using a dynamic binary instrumentation (DBI) tool, e.g., PIN. The PIN tool performs tracking of every instruction executed by taking complete control over the run-time execution of the binary.

The AI-powered processor comprises various machine learning (ML) components to assist in multi-level code analysis. Natural Language Processing (NLP) techniques such as N-gram, Term Frequency-Inverse Document Frequency (TF-IDF), and Term Frequency (TF) are used and leveraged to generate a feature database to be fed into the ML classifiers. To find association rules, a data mining (DM) approach referred to as an FP-growth algorithm is used and leveraged to discover notable relations and patterns among variables at multiple levels while analyzing an executable. Through the behavior chain component, ransomware/malware specific chains are discovered, thereby showing the relationships at three levels (i.e., DLL level, function call level, and assembly level).

Figure 1:
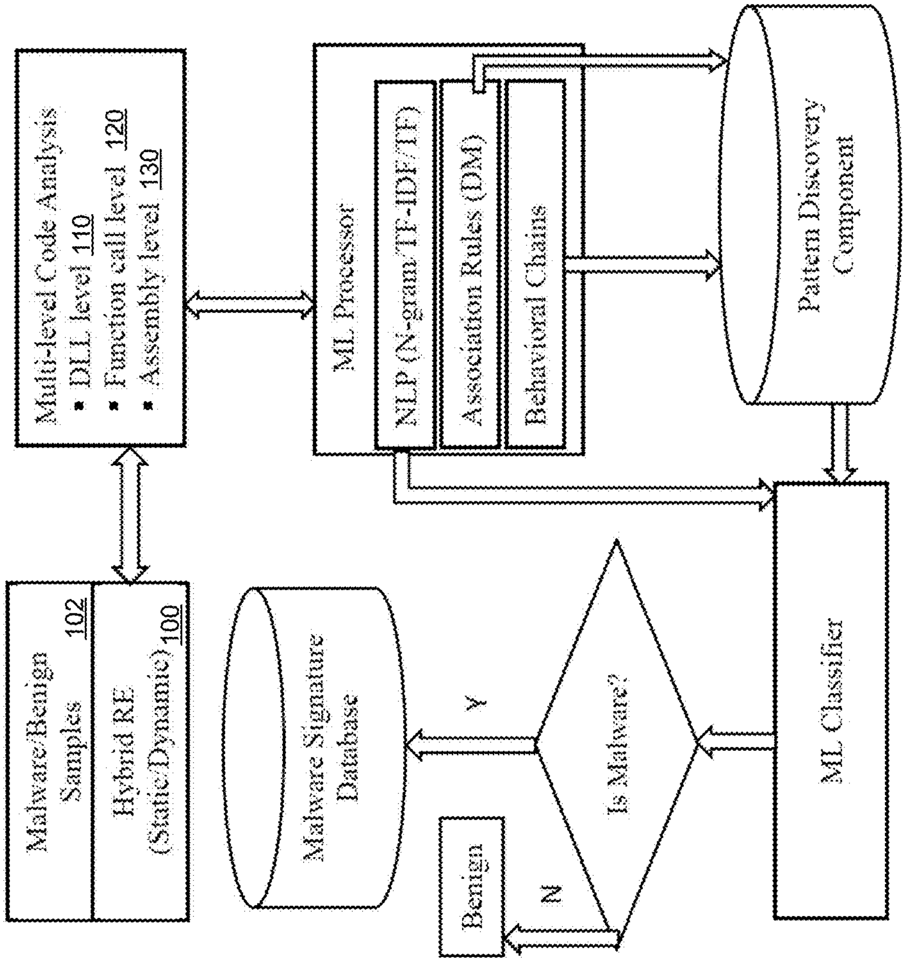
FIG. 1 shows a diagram of an AI-powered malware detection framework in accordance with an exemplary embodiment of the present invention.
Figure 2:
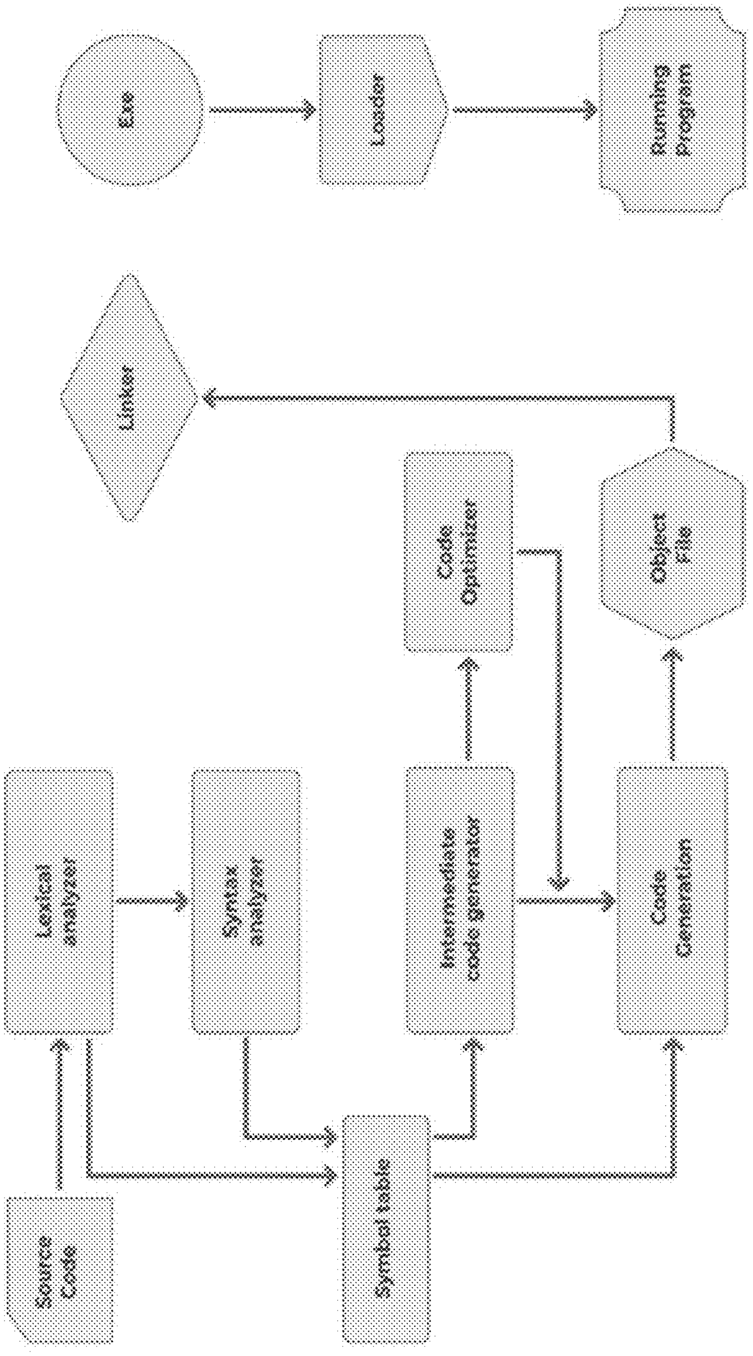
FIG. 2 shows a diagram of the life cycle of a binary file (from source code to object file to executable to a running program).

FIG. 1 shows the overall back-end architecture of an AI-powered malware (including, but not limited to, ransomware) detection framework for, among other things, creation of a malware/ransomware signature database. The first step comprises hybrid reverse engineering ("Hybrid RE") 100. Malware samples and benign binary samples 102 are reverse engineered using a hybrid approach involving both static analysis and dynamic analysis of the samples. This same framework may be used to analyze a particular piece of code whose status as benign or malware is unknown. In that form, the first step comprises hybrid reverse engineering of that code (in place of the samples described above).

Static analysis involves observing and extracting some features of a binary placed or stored in a hard drive. In contrast, dynamic analysis involves extracting behavior and features by running the binary in the memory.

Static analysis is necessary to capture the initial properties of the binary. Further analysis is done using a PE parser (such as, but not limited to, Object dump, a Linux-based tool and PE parser, an open-source tool) to reveal properties such as, but not limited to, import and export of functions by the binaries. Static analysis is assumed to achieve higher code coverage than via dynamic analysis because some missing parameters may misguide the dynamic analysis. Static analysis generally tracks the code from start to end, although though the dynamic behavior is not captured.

Dynamic analysis is done using a virtualized environment (such as, but not limited to, a Cuckoo sandbox) and a dynamic binary instrumentation tool (such as, but not limited to, PIN). The modern version of ransomware families is often difficult to analyze due to their anti-analysis techniques. The hybrid analysis of the present invention traverses this difficulty. This phase also includes the initial pre-processing of the received raw outputs obtained via the adopted reverse engineering approaches.

The present invention extracts the binary behavior and properties specific to three levels of the code: (1) DLL (Dynamic Link Library) level 110; (2) function call level 120; and (3) assembly level 140.

DLLs are dynamic link libraries which are subroutines to perform actions such as file system manipulation, navigation, process creation, communication, and so on. They are loaded into the memory whenever required and freed from memory whenever not needed, thereby making the present system lightweight by making effective use of available memory and resources by dynamic linking capability. DLLs have functions that they export and make it available to other programs. During a program run, all necessary DLLs are loaded into the memory, but the referenced function call is accessed only when needed by locating the memory address where the function code resides. There are certain DLLs that are called more often because the function calls implemented by them are significant to carry out actions as per malware behavior.

Figure 3:
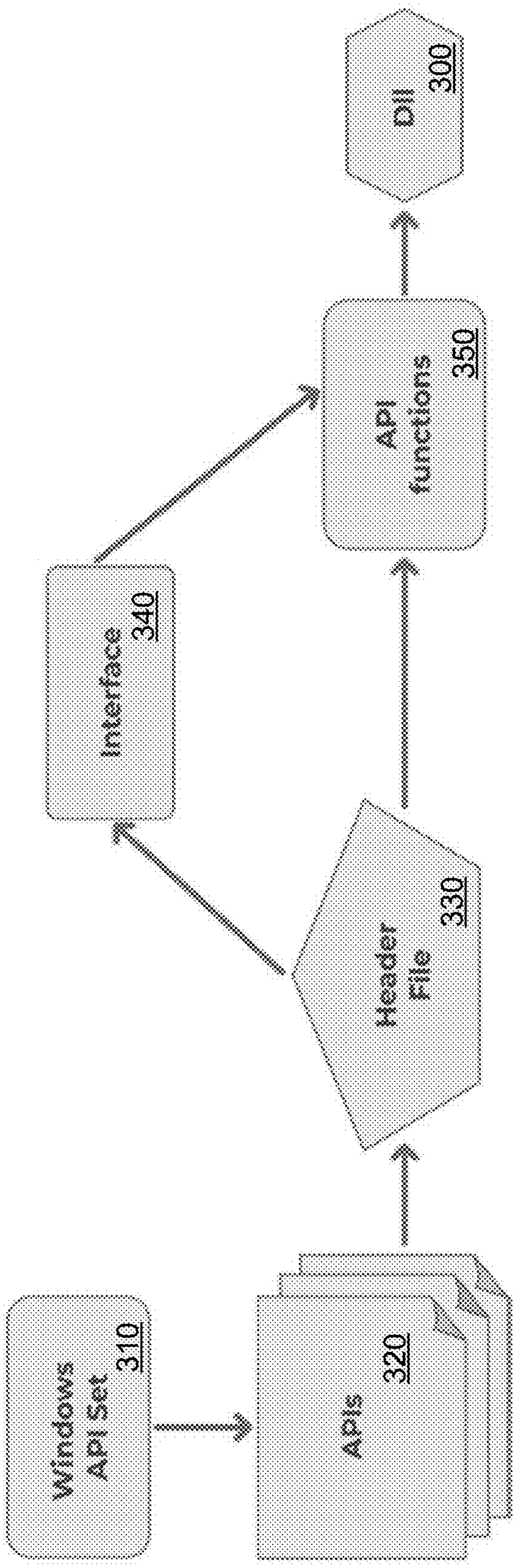
FIG. 3 shows a hierarchy of a Windows DLL (Dynamic Link Library).

As shown in FIG. 3, a dynamic link library is a library that contains code and data that can be used by more than one program at the same time. The main benefit of a DLL is code reusability and efficient memory usage. A DLL 300 can be user defined or entity/Microsoft defined. For example, Windows API set 310 is the super-set which consists of one or more Application Programming Interfaces (APIs) 320. Each API comprises a header file 330 with or without interfaces 340 which comprise API functions 350. DLL makes these API functions act upon and can be considered a bridge between the user space and the kernel space.

A function call is a piece of code that has lines of instructions that make an impact to the system or user. These are essential code blocks that carry out various functionalities and have less overlapping than in the DLL level analysis or assembly level analysis. Analysis at this level helps to identify function calls that are more unique to a malware's behavior. Categorization of functions based on functionality, such as, but not limited to, file operations, system information gathering, file enumeration, encryption key generation, and encryption, are some of the key behaviors specific to malware and ransomware that are analyzed at this level.

Assembly instruction is a low-level machine instruction, which is also called machine code. It can be directly executed by a computer's central processing unit (CPU). Each assembly instruction causes a CPU to perform a specific task, such as add, subtract, jump, xor, and so on.

Figure 4:
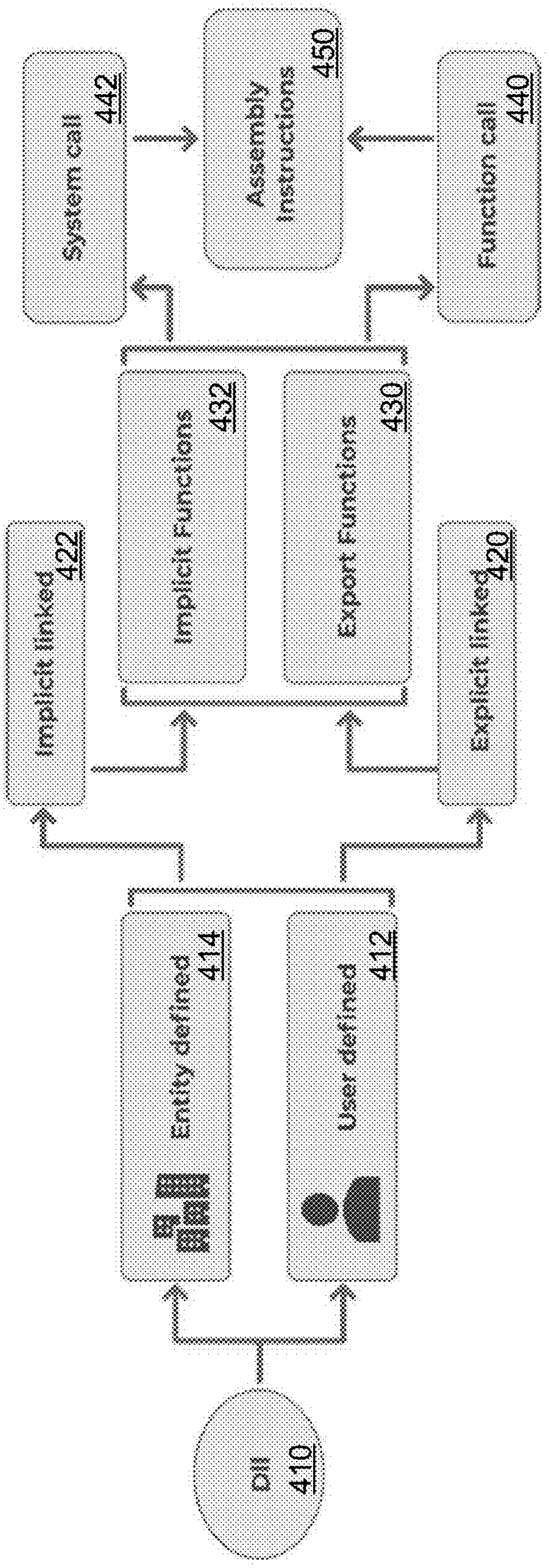
FIG. 4 shows a hierarchy of function calls and assembly instructions in a DLL.

FIG. 4 shows a hierarchy of function calls and assembly instructions in a DLL 410. Each DLL may be user defined 412 or entity defined 414. Each DLL, which is implicitly linked 420 or explicitly linked 422, comprises both import functions 432 and export functions 430.

Each function call 440 or system call 442 is implemented via assembly instructions 450. Assembly instructions are also analyzed based on categorized groupings. Some of the categories are Data transfer, Logical, Control transfer, Flag control, and the like.

Malware and ransomware specific behavioral chains are basically multilevel chains which are constructed by studying the behavior of different ransomware families. A chain is a continuous sequence of ingredients or components that achieve a particular functionality or activity. An algorithm 510 for hybrid multi-layering profiling (HMLP) of behavioral chains is shown in FIG. 5. Both static and dynamic analysis of ransomware binaries reveals the different chains which are seen in a wide range of malware and ransomware families.

FIG. 6 shows the chains 610 commonly seen in malware and ransomware binaries. These chains are created at DLL function call, and assembly level, leveraging the feature extraction component of the hybrid RE system described herein. The system is used to inspect the function and activity traces of major malware and ransomware families, and define the major chains which are seen therein. For an unknown sample of code, these chains are detected, discovered and validated automatically using a chain validator component, which uses association rule mining.

Chain A deals with system services and an initial setup. It uses GetStartupInfoW which gets information related to the window station, desktop, and appearance of the main window. GetStdHandle gets a handle to the specified IO device. These handles are used by Windows applications to read and write to the console. These are also used by ReadFile and WriteFile functions. GetEnvironmentStringsW makes the environment variables available for the current process running in an infected computer. FreeEnvironmentStringsW frees all environment settings. This function is generally used only once. Malware writers do not want to interfere with their work. They may use SetEnvironmentVariable to set certain variables to fulfill their malicious behavior. IsProcessorFeaturePresent determines whether the specified processor feature is supported by the system in use.

Chain B deals with module enumeration. GetModuleFileName loads the malware executable and GetModuleHandle gets the handle to the custom malware DLL with obfuscated functions. Obfuscation behavior can be captured at the assembly level.

Chain C deals with the anti-analysis behavior of the ransomware. GetTickCount gives the time in milliseconds that have passed since the system was started. GetSystemInfo and GetNativeSystemInfo use dwNumberOfProcessors method to check the number of processors running in a system. If the system has only one processor then the malware writers label it as an analysis environment and may not execute at all. GetUserDefaultUILanguage gets the language identifier for the current user while GetSystemDefaultUILanguage gets for the operating system. This function chain is often used to reveal the user language so that the malware writers can decide whether to execute further or not based on the country and spoken language preferences.

Chain D deals with access elevation. OpenProcessToken opens the token associated with a given process while GetTokenInformation is used to obtain the token id, session id, or security identifier of the process's owner. This obtained token is duplicated and applied to a new thread created in suspended mode using SetThreadToken. It also contains function calls to bypass user access control by elevating the privilege to the admin level.

In Chain E, CreateToolhelp32Snapshot is used to create a snapshot of processes, heaps, threads, and modules. Malware often uses this function as part of the code that iterates through processes or threads. This snapshot function is called during different functionality blocks such as while loading DLLs, loading application processes, loading antivirus processes, and so on. Process32FirstW gets information about the first process seen in a system snapshot. This is used to enumerate processes from a previous call to CreateToolhelp32Snapshot.

Chain F deals with parameter setup. The command-line string via GetCommandLineA serves as one parameter value to be passed to GetCommandLineW function which later removes malware itself and deletes shadow copies via the command prompt window.

Chain G is concerned with profiling system identifiers. Some of the often profiled system identifiers are keyboard layout, Windows version used, domain used, CPU identifier, and so on. RegOpenKeyExW opens the specified registry key for system profiling. The parameter lpSubKey specifies the name of the registry key to be open. The access right for the registry key object is KEY EXECUTE (0x20019), which is equivalent to KEY READ.

Chain H is concerned with encryption setup. The CryptAcquireContextW function is used to acquire a handle to a key container implemented by either cryptographic service provider (CSP) or Next-generation CSP. The szProvider parameter specifies this information. The CryptGenKey generates a public/private key pair. The handle to the key is returned in parameter phKey. It has the Algid parameter which specifies the type of encryption algorithm being used. For example, Algid=0xa400 represents CALG RSA KEYX as the "RSA public key exchange algorithm". The CryptExportKey function exports a cryptographic key pair from a CSP in a secure manner. At the receiver end CryptImportKey function should be used to receive the key pair into a recipient's CSP. CryptDestroyKey destroys the encryption handle but not the keys. CryptReleaseContext releases the handle of a cryptographic service provider and a key container.

Chain I deals with file encryption. At first, malware/ransomware iteratively finds next files in a given folder to encrypt using Find-NextFileW then writes the filename-.some unique extension as a new filename to the buffer using wsprintfw. The local file names are often compared if they are not among these files—autorun.inf, ntuser.dat, iconcache.db, bootsect.bak, boot.ini, ntuser.dat.log, thumbs.db, ransom note.html, ransom note.tx—so that it will not interfere with the normal functioning of the system and also should not encrypt the ransom message. lstrcmpiW is used to make comparisons with the discovered filename with the hardcoded list of filenames. This list or approach slightly differs among various ransomware families. The CryptAcquireContextW handle is called to get the CryptoAPl function, i.e., CryptGenRandom, ready to use. Here, CryptGenRandom is used to generate a random key to be used by symmetric encryption algorithms.

CryptEncrypt does the real encryption of text or strings. CryptDestroyKey only destroys the encryption handle but not the keys. CryptReleaseContext releases the handle of a cryptographic service provider and a key container.

CreateFileW creates a new file or opens an already existing file to overwrite its content. ReadFile reads the just opened file using its handle from the position specified by the file pointer. WriteFile writes given data of buffer pointer to the specified file. Finally, MoveFileW function moves file to the same or different location but with a different filename extension (i.e., some extension is attached to the current filename). Again, this differs among malware/ransomware families. Some malware/ransomware families overwrite the filename with some random strings being generated using the CryptGenRandom function.

Chain J deals with creating a ransom note. Wsprintfw function writes some file name ransom message.txt to buffer then creates a new file of that name and returns the handle using CreateFileW. LstrlenW gets a length of the text to be written while WriteFile is used to write the ransom note to the specified file. Finally, CloseHandle closes the file handle given by the CreateFileW function.

Chain K has functions associated with network enumeration. The functions WNetOpenEnumW, WNetEnumResourceW, and WNetCloseEnum are used in a chain for lateral movement across the network to infect more victim's machines.

Chain L deals with self-delete. GetModuleFileNameW gets the malware executable location while the function wsprintfW writes the previously obtained command line parameter to buffer. The ShellExecuteW function via lpFile parameter value as cmd.exe executes the given command.

Chain M deals with error handling. GetLastError gets the last error code for the calling thread of the given process. GetCurrentThreadId gets the identifier value for the thread whose error code for execution of a certain function is to be considered. SetLastError sets the error code for the calling thread of a given process. For example zero error code means error success and the operation was successfully completed. This sequence comes more often to get the status of functions being executed.

Chain N deals with command and control (CC) server communication. This function chain differs among different ransomware families as some use hard-coded URL, some use domain generation algorithm, and the way to get the victim's IP address also differs. Here, the most seen common sequence is illustrated. InternetOpenW function opens the browser application, InternetConnectW opens a File Transfer Protocol (FTP) or HTTP session for a given site. Malware may use pv4bot.whatismyipaddress.com to find the victim's IP address or they could find it via command prompt. In the meantime, it connects to CC server via HttpOpenRequestW using the handle of InternetConnectW function. HttpAddRequestHeadersW specifies the CC server. InternetReadFile reads the data from a handle opened by the InternetOpenUrl, FtpOpenFile, or HttpOpenRequest function. Finally, InternetCloseHandle closes the internet handle.

Figure 7:
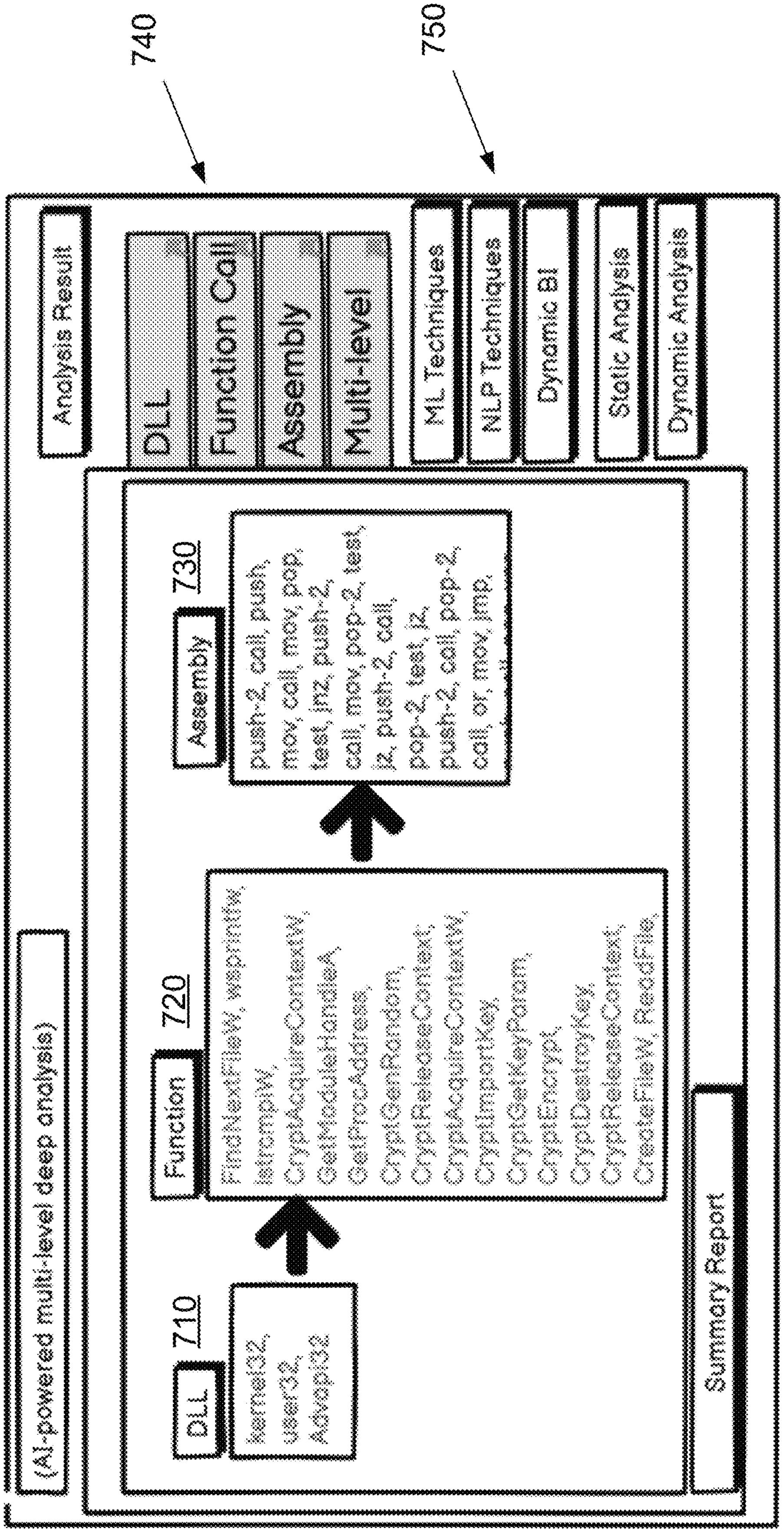
FIG. 7 shows a view of an AI-based malware detection (AIMaD) tool interface.

FIG. 7 shows an output interface of an exemplary embodiment of the present invention. It shows the multi-level mapping for file encryption activity. The main box shows DLL 710, function call 720, and assembly 730 components, with arrows pointing from the DLL level to the function call level to the assembly level. This association among these three levels is significant to recognizing ransomware specific behavior and creating unique signatures. The upper part of the rightmost column shows buttons 740 for the user to choose either one level of analysis (i.e., DLL, Function Call, or Assembly) or multi-level analysis. Choosing the DLL option shows all the DLLs specific to the selected sample. Similarly, choosing the function call option or the assembly options\ show all the respective options specific to the selected sample. The multi-level option shows DLL, function call and assembly level mappings of various ransomware behavioral chains. The bottom portion of the shows buttons 750 for machine learning techniques, NLP techniques, dynamic binary instrumentation (BI, or DBI), and static and dynamic analysis approaches used. A user thus is able to select which machine learning algorithm they want to evaluate with, NLP techniques, and dynamic binary instrumentation. This tool leverages the techniques described above and can also be considered an explanatory AI tool as it identifies the distinguishing behavioral chains which help to create a unique dataset for machine learning (ML) models.

In some embodiments, the system considers association rules with minimum support threshold 2 and confidence threshold 0.8, and check whether these match with the defined chain ingredients. Only the matching chains are considered to form the functionality chains. All non-matching chains with previously defined support and confidence scores are part of arbitrary functionality chains. Both association rules and behavior chain component(s) contribute to malware pattern discovery. The pattern database consists of all the discovered patterns. This database is considered as a feature database for the ML classifier. If the binary under consideration is malware, then its signature will be stored in the malware signature database and the binary is deleted. This decision is based on given threshold accuracy. If the binary is not malware, then it is labeled as a benign executable and not deleted.

Accordingly, advanced malware is detected via a multi-level analysis and behavioral chaining at DLL, function call and assembly code level. Reverse engineering of binaries are performed using a hybrid analysis. Moreover, the analysis engine uses an integrated AI approach (i.e., datamining and machine learning) for making robust decisions. The AIMaD tool uses these techniques and systems and provides the meaningful analysis of results.

Existing malware analysis techniques and products try to detect malware by analyzing features at one level (such as PE file analysis, file entropy, traffic flow, network features, and API call analysis) and do not correlate between levels, and thus fail to detect and handle most advanced malware. In contrast, the present invention handles advanced, sophisticated malware due to its unique approach of capturing characteristics at multiple levels via behavioral chain analysis. It also is flexible in its ability to add new analysis techniques.

In an exemplary embodiment, the present invention comprises a method to detect and analyze malware, comprising the steps of:

- receiving, at a server with a microprocessor in electronic communication with a database over a network, code that may comprise malware;
- automatically performing, using said microprocessor, static analysis of said code to identify structural properties thereof;
- automatically performing, using said microprocessor, dynamic analysis of said code;
- automatically generating a feature list based on said static analysis and said dynamic analysis;
- automatically performing multi-level classification using said feature list to determine one or more behavior chains in said code, based on relations and patterns among variables at multiple levels in said code; and
- automatically determining whether any of said one or more behavior chains in said code comprise a malware-specific chain.

The above method, further wherein said structural properties comprise import and export of functions. The above method, further wherein performing dynamic analysis is performed in a virtualized environment. The above method, further wherein performing dynamic analysis is performed by analyzing function call traces of the code, and further wherein analyzing function call traces is performed using a dynamic binary instrumentation tool, wherein said dynamic binary instrumentation tool controls run-time execution of the code and tracks every instruction executed. The above method, further wherein performing dynamic analysis comprises reverse engineering of binary code. The above method, further wherein performing multi-level classification comprises detecting behavior chains at a Dynamic Link Library (DLL) level, a function call level, and an assembly-code level. The above method, further wherein performing multi-level classification comprises identifying association rules. The above method, further comprising automatically determining whether said code comprises malware.

In additional embodiments, the present invention further comprises a non-transitory process-readable medium storing code representing instructions to be executed by a processor, the code comprising code to cause the processor to carry out the method described above.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method to detect and analyze malware, comprising:

receiving, at a server with a microprocessor in electronic communication with a database over a network, code that may comprise malware;

automatically performing, using said microprocessor, static analysis of said code to identify structural properties thereof, wherein said structural properties comprise import and export of functions;

automatically performing, using said microprocessor, dynamic analysis of said code;

automatically generating a feature list based on said static analysis and said dynamic analysis;

automatically performing multi-level classification using said feature list to determine one or more behavior chains in said code, based on relations and patterns among variables at multiple levels in said code, wherein performing multi-level classification comprises detecting behavior chains at a Dynamic Linked Library (DLL) level, a function call level, and an assembly-code level, and considering association rules with an established minimum support threshold and a minimum confidence threshold; and automatically determining whether any of said one or more behavior chains in said code comprise at least one malware-specific chain;

wherein said at least one malware-specific chain comprises one or more of the following: (i) anti-analysis behavior, including the decision not to execute further based on detected system characteristics; (ii) access-elevation behavior; (iii) snapshot behavior to obtain information about the current state of the system, including, but not limited to, processes, heaps, threads and modules; (iv) file encryption detection behavior; (v) ransom note creation behavior; or (vi) self-deletion behavior.

2. The method of claim 1, wherein performing dynamic analysis is performed in a virtualized environment.

3. The method of claim 1, wherein performing dynamic analysis is performed by analyzing function call traces of the code.

4. The method of claim 3, wherein analyzing function call traces is performed using a dynamic binary instrumentation tool.

5. The method of claim 4, wherein said dynamic binary instrumentation tool controls run-time execution of the code and tracks every instruction executed.

6. The method of claim 1, wherein performing dynamic analysis comprises reverse engineering of binary code.

7. The method of claim 1, further comprising automatically determining whether said code comprises malware.

8. A non-transitory process-readable medium storing code representing instructions to be executed by a processor, the code comprising code to cause the processor to:

receive, at a server in electronic communication with a database over a network, code that may comprise malware;

automatically perform static analysis of said code to identify structural properties thereof, wherein said structural properties comprise import and export of functions;

automatically perform dynamic analysis of said code;

automatically generate a feature list based on said static analysis and said dynamic analysis;

automatically perform multi-level classification using said feature list (i) to determine one or more behavior chains in said code, based on relations and patterns among variables at multiple levels in said code, (ii) to detect behavior chains at a Dynamic Linked Library (DLL) level, a function call level, and an assembly-code level, and (iii) to consider association rules with an established minimum support threshold and a minimum confidence threshold; and automatically determine whether any of said one or more behavior chains in said code comprise at least one malware-specific chain;

wherein said at least one malware-specific chain comprises one or more of the following: (i) anti-analysis behavior, including the decision not to execute further based on detected system characteristics; (ii) access-elevation behavior; (iii) snapshot behavior to obtain information about the current state of the system, including, but not limited to, processes, heaps, threads and modules; (iv) file encryption detection behavior; (v) ransom note creation behavior; or (vi) self-deletion behavior.

9. The medium of claim 8, wherein performing dynamic analysis is performed in a virtualized environment.

10. The medium of claim 8, wherein performing dynamic analysis is performed by analyzing function call traces of the code.

11. The medium of claim 10, wherein analyzing function call traces is performed using a dynamic binary instrumentation tool.

12. The medium of claim 11, wherein said dynamic binary instrumentation tool controls run-time execution of the code and tracks every instruction executed.

13. The medium of claim 8, wherein performing dynamic analysis comprises reverse engineering of binary code.

14. The medium of claim 8, further comprising automatically determining whether said code comprises malware.

* * * * *